United States Patent
Kshirsagar et al.

(10) Patent No.: US 11,990,748 B2
(45) Date of Patent: May 21, 2024

(54) POWER SUPPLY SYSTEM AND CONTROL IN A SERIES DYNAMIC LOAD CONFIGURATION

(71) Applicant: Infineon Technologies Austria AG, Villach (AT)

(72) Inventors: Kushal Kshirsagar, Warwick, RI (US); Prasan Kasturi, Sharon, MA (US); Danny Clavette, Greene, RI (US); Darryl Tschirhart, Cambridge (CA)

(73) Assignee: Infineon Technologies Austria AG, Villach (AT)

( * ) Notice: Subject to any disclaimer, the term of this patent is extended or adjusted under 35 U.S.C. 154(b) by 253 days.

(21) Appl. No.: 17/321,738

(22) Filed: May 17, 2021

(65) Prior Publication Data
US 2022/0368230 A1    Nov. 17, 2022

(51) Int. Cl.
*H02J 1/10* (2006.01)
*H02M 3/158* (2006.01)

(52) U.S. Cl.
CPC .......... *H02J 1/102* (2013.01); *H02M 3/1584* (2013.01)

(58) Field of Classification Search
CPC .... H02J 1/102; H02M 3/1584; H02M 3/1586; H02M 3/1588; H02M 1/0048; H02M 1/0032; H02M 1/0077
See application file for complete search history.

(56) References Cited

U.S. PATENT DOCUMENTS

| | | | |
|---|---|---|---|
| 10,985,652 B1* | 4/2021 | Jiang | G05F 1/618 |
| 2009/0327786 A1* | 12/2009 | Carroll | H02M 3/157 |
| | | | 713/340 |
| 2012/0139505 A1 | 6/2012 | Ren et al. | |
| 2014/0266377 A1* | 9/2014 | Atout | H03K 3/011 |
| | | | 327/295 |
| 2015/0357913 A1* | 12/2015 | Tschirhart | H02M 3/156 |
| | | | 323/282 |
| 2017/0179822 A1* | 6/2017 | Kobayashi | H02M 3/158 |
| 2018/0131263 A1* | 5/2018 | Sreenivas | H02M 3/1584 |
| 2020/0136514 A1* | 4/2020 | Masich | H02M 3/1584 |
| 2020/0272181 A1 | 8/2020 | Araki et al. | |

OTHER PUBLICATIONS

Extended Search Report, EP 22 17 3783, dated Oct. 14, 2022, pp. 1-7.
Hyun-Lark Do, "Nonisolated Bidirectional Zero-Voltage-Switching DC-DC Converter", IEEE Transactions On Power Electronics, Institute of Electrical and Electronics Engineers, USA, vol. 26, No. 9, Sep. 9, 2011 (Sep. 9, 2011), pp. 2563-2569, XP011383362.

(Continued)

*Primary Examiner* — Hal Kaplan
*Assistant Examiner* — Rasem Mourad
(74) *Attorney, Agent, or Firm* — Armis IP Law, LLC

(57) ABSTRACT

An apparatus includes a controller. The controller monitors a magnitude of voltage powering a first dynamic load disposed in a series circuit path of multiple dynamic loads. The controller compares the magnitude of the voltage to a reference voltage. Based on the comparing, the controller controls operation of multiple power converter phases in a power converter to maintain a magnitude of the voltage powering the first dynamic load.

32 Claims, 12 Drawing Sheets

(56) References Cited

OTHER PUBLICATIONS

Jae-Won Yang et al: "Bridgeless SEPIC Converter With a Ripple-Free Input Current", IEEE Transactions On Power Electronics, Institute of Electrical and Electronics Engineers, vol. 28, No. 7, Jul. 7, 2013 (Jul. 7, 2013), pp. 3388-3394, XP011484386.
Zhu KE, et al: "1.5 kW Single Phase CCM Totem-Pole PFC using 650V SiC Cascodes", 2016 IEEE 4th Workshop On Wide Bandgap Power Devices and Applications (WIPDA), IEEE, Nov. 7, 2016 (Nov. 7, 2016), pp. 90-94, XP033029823.
Extended Search Report, EP 22 217 404.7, dated May 23, 2023, pp. 1-10.

* cited by examiner

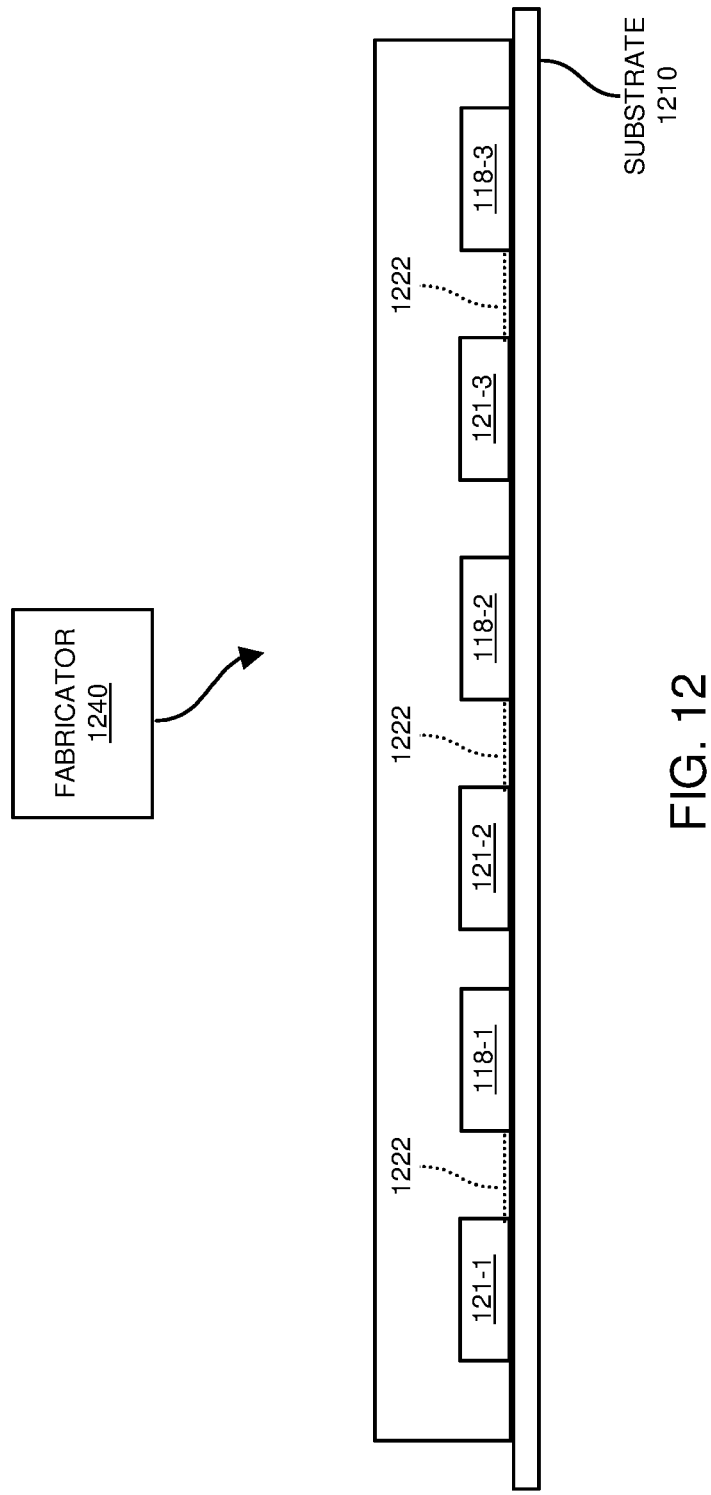

POWER SUPPLY SYSTEM AND CONTROL IN A SERIES DYNAMIC LOAD CONFIGURATION

BACKGROUND

As transistor density of digital circuits continues to increase, so does the current consumed by respective loads incorporating those transistors. To address this issue, it has been proposed to connect processor cores in series. In such an instance, a Main voltage regulator (a.k.a., VR) provides power to the series stack of processor core loads. Both the main voltage regulator and a corresponding Local voltage regulator (associated with each load) for each load are ground referenced, while higher indexed Local VRs are referenced to the output of the lower-indexed VR.

If desired, the Main voltage regulator and Local voltage regulator can be implemented as multi-phase VRs. A main power supply provides floating power to each Local VR.

During operation, the main VR provides a current to the series stack of dynamic loads that is equal to the average demand of the processor cores. The Local voltage regulators, in turn, provide extra current to power a respective dynamic load when that corresponding load consumes more power than power supplied by the main power supply via the main supply current provided through each dynamic load. In a perfectly balanced system, the local VR theoretically provides no current. However, power consumption by respective loads can change without notice. In such an instance, the voltage regulator assigned to monitor the respective dynamic load supplies additional power to the dynamic load so that the voltage across the dynamic load does not fall below a respective threshold value.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

Embodiments herein include novel ways of implementing control of one or more power converters to a power a load.

More specifically, embodiments herein include an apparatus and/or system including a controller. The controller monitors a magnitude of a voltage powering a first dynamic load, which is one of multiple dynamic loads disposed in series. The controller compares the magnitude of the voltage to a reference voltage. Based on results of the comparing, the controller controls operation of one or more power converter phases in a power converter to maintain a magnitude of the voltage powering the first dynamic load.

In one embodiment, the reference voltage is a threshold level. The controller controls operation of the one or more power converter phases such that the magnitude of the voltage does not increase above the threshold level.

In further example embodiments, the first dynamic load is disposed downstream of a second dynamic load. In such an instance, the first dynamic load receives current supplied from the second dynamic load of the multiple dynamic loads disposed in series. In further example embodiments, the controller monitoring the first dynamic load varies how many of its multiple phases are activated to regulate the voltage powering the first dynamic load below the reference voltage. In one embodiment, reducing power supplied to the first dynamic load includes sequentially activating one or more additional power converter phases over time in response to a condition in which the first dynamic load consumes less and less power over time and the supply current would otherwise provide too much power to the first dynamic load.

In further embodiments herein include, via the controller, at least temporarily operating a first power converter phase of the multiple power converter phases in a variable switching frequency mode to regulate the magnitude of the voltage powering the first dynamic load below the reference voltage (such as threshold level).

Yet further example embodiments herein include, via the controller, at least temporarily operating a first power converter phase of the multiple power converter phases in a discontinuous conduction mode to regulate the magnitude of the voltage across the first dynamic load.

In still further example embodiments, the control of the multiple power converter phases adjusts an amount of current through the first dynamic load. For example, in one embodiment, the controller varies which of the multiple power converter phases that are simultaneously activated to adjust the current through the first dynamic load. In one embodiment, the simultaneous activation of the multiple power converter phases regulates the voltage such that the voltage across the first dynamic load stays below a threshold level as the first dynamic load consumes less power.

In yet further example embodiments, for a first time duration, the controller operates a first power converter phase of the multiple power converter phases in a discontinuous conduction mode to regulate such as maintain a magnitude of the voltage below the reference voltage. For a second duration following the first time duration, when the first dynamic load consumes less power, the controller operates the first power converter phase of the multiple power converter phases in a continuous conduction mode (instead of discontinuous conduction mode) to regulate the magnitude of the voltage powering the first dynamic load. For a third duration following the second time duration, when the first dynamic load consumes even less power, the controller operates the first power converter phase and the second power converter phase of the multiple power converter phases in the continuous conduction mode to regulate the magnitude of the voltage powering the first dynamic load.

In further example embodiments, each of the multiple power converter phases supports bidirectional current flow such as providing positive supplemental current and/or negative supplemental current to the first dynamic load. In such an instance, the multiple power converter phases can be operated to increase or decrease current through the first dynamic load depending on power consumption by the first dynamic load.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: monitor a magnitude of a voltage powering a first dynamic load, the first dynamic load being one of multiple dynamic loads disposed in series; compare the magnitude of the voltage to a reference voltage; and based on the comparing, control operation of multiple power converter phases in a power converter to maintain a magnitude of the voltage supplied to the first dynamic load.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 12 is an example diagram illustrating assembly of a circuit according to embodiments herein.

Figure 1:
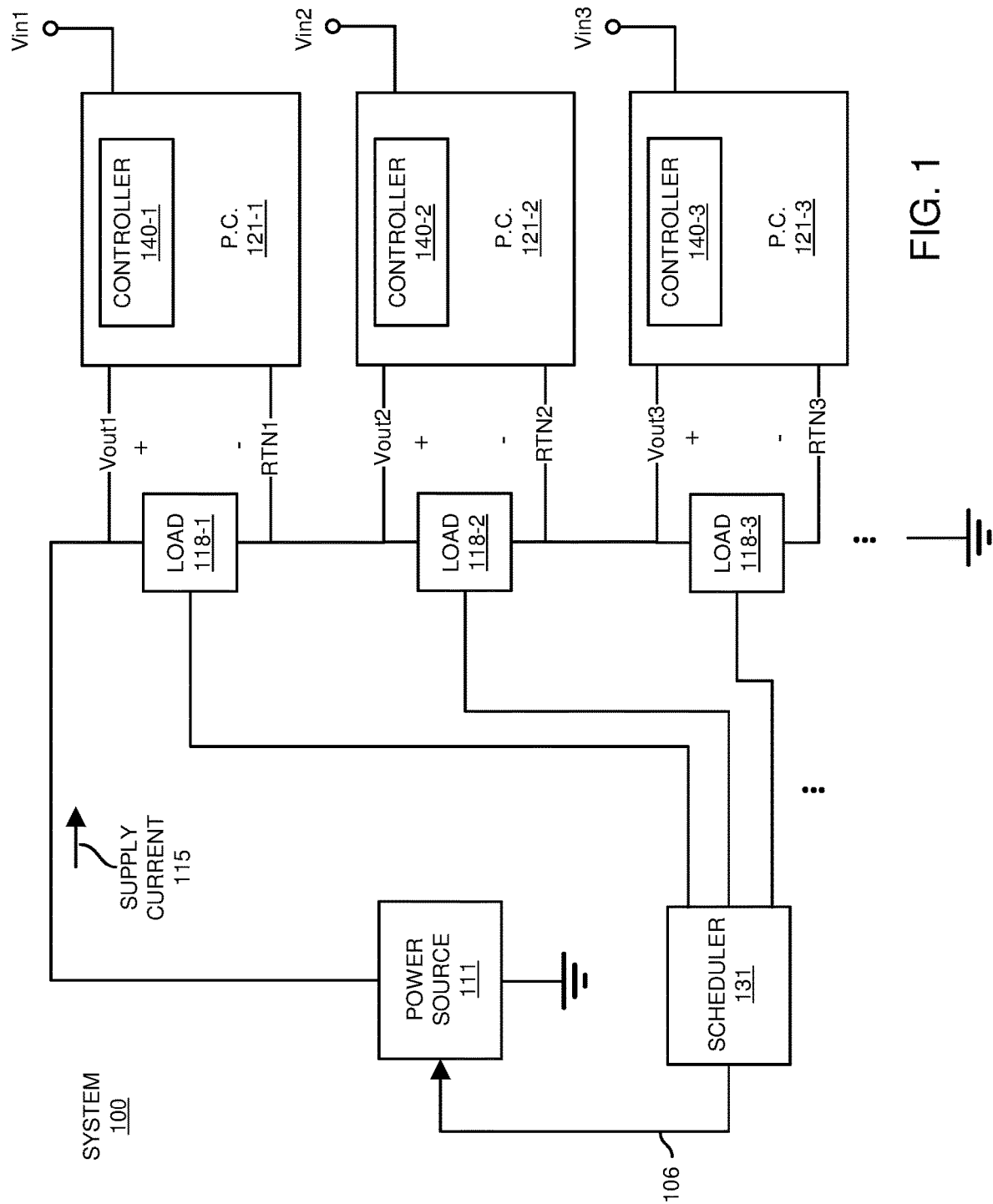
FIG. 1 is an example general diagram of a power system (power supply) including multiple power converters that adjust current associated with a stack of series connected dynamic loads according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include implementing novel negative current limits and control for efficient steady-state bidirectional operation of a respective multi-phase power converter in a stacked dynamic load environment. For example, each multi-phase power converter assigned to a dynamic load as discussed herein supports phase shedding and PFM (Pulse Frequency Mode) operation for both (buck and boost) operating modes to promote high efficiency across the dynamic load range, preventing corresponding dynamic loads from being exposed to potentially damaging high voltage conditions that occur when the dynamic load consumes less power than expected. The stacking of the dynamic loads as discussed herein reduces power loss in the power delivery network; implementation of the local power converters assigned to the dynamic loads ensures safe and efficient operation of the dynamic loads when there is a power consumption imbalance (variation) amongst the dynamic loads in the stack.

Now, more specifically, FIG. 1 is an example general diagram of a power supply and multiple loads according to embodiments herein.

In this example embodiment, the system 100 includes power source 111, scheduler 131, multiple dynamic loads 118-1, 118-2, 118-3, etc., power converters 121-1, 121-2, 121-3, etc.

Each of the power converters 121 (such as voltage regulators or other suitable entities) includes a respective controller. For example, power converter 121-1 includes controller 140-1; power converter 121-2 includes controller 140-2; power converter 121-3 includes controller 140-3; and so on.

Note that the system 100 can include any number of dynamic loads and corresponding power converters disposed in series.

Note further that any of the components as described herein can be implemented as hardware, software, or a combination of hardware and software. For example, the scheduler 131 can be implemented as scheduler hardware, schedule software, or combination of scheduler hardware and software; the controller 140-1 can be implemented as controller hardware, controller software, or combination of controller hardware and controller software; the controller 140-2 can be implemented as controller hardware, controller software, or combination of controller hardware and controller software; and so on.

As further shown, and as previously discussed, each of the dynamic loads is disposed in a series manner (such as stack) between the power source 111 and corresponding ground reference. The power source 111 produces the supply current 115 that passes through each of the dynamic loads 118-1, 118-2, 118-3, etc., during balanced conditions when each of the dynamic loads consumes a same amount of power.

In one embodiment, the power source 111 produces a respective DC output voltage, resulting in generation of the supply current 115.

Individual voltage sources supply power to the power converters 121. For example, the input voltage Vin1 powers the power converter 121-1; the input voltage Vin2 powers the power converter 121-2; the input voltage Vin3 powers the power converter 121-3; and so on.

Each of the dynamic loads 118 has its own local (floating) ground reference (labeled voltage RTN) that is independent of the ground associated with the power source 111. In general, flow of the supply current 115 through each of the dynamic loads 118 results in generation of a respective voltage across the dynamic load.

As a more specific example, flow of supply current 115 through the dynamic load 118-1 results in a voltage of Vout1-RTN1 across the dynamic load 118-1; flow of supply current 115 through the dynamic load 118-2 results in a voltage of Vout2-RTN2 across the dynamic load 118-2; flow of supply current 115 through the dynamic load 118-3 results in a voltage of Vout3-RTN3 across the dynamic load 118-3; and so on.

Ideally, during balanced conditions, each of the dynamic loads 118 represents a substantially equal resistance (or impedance) such that each of the voltages Vout1-RTN1, Vout2-RTN2, Vout3-RTN3, etc., are substantially equal.

Note that the dynamic loads 118 can be any suitable circuitry such as a stacked system with multiple printed circuit boards (each board being a dynamic load), multiple processors in the same semiconductor chip (each dynamic load being a processor core in the semiconductor chip), separate semiconductor chips, separate circuits, etc.

In one embodiment, each of the dynamic loads 118 is a processor, processor system, circuitry, etc., that executes one or more instructions depending on a schedule generated by the scheduler 131. The scheduler 131 attempts to balance execution of the instructions such that each of the dynamic loads 118 consumes a substantially same amount of power for a given block of time and in which respective voltage drops across each dynamic loads are substantially equal.

Based on the scheduling of instructions, and anticipated power needed by each of the dynamic loads to execute a respective set of scheduled instructions, the scheduler 131 produces the respective control signals supplied to the power source 111. In one embodiment, the control signal 106 notifies the power source 111 how much current to supply through the series connection of dynamic loads 118 to accommodate the scheduled instructions for a given block of time.

It is noted that there may be variation of power consumption by each of the dynamic loads. In such an instance, the voltage across the dynamic loads may vary and result in an over-voltage condition or under voltage condition that could damage the one or more dynamic loads. Embodiments herein include implementing a respective power converter for each dynamic load to ensure that voltage across each dynamic load is substantially constant even if one or more of the dynamic loads happen to consume more or less current than expected.

For example, in one embodiment, power converter 121-1 monitors a respective voltage (Vout1-RTN1) across the dynamic load 118-1. During operation, the power converter 121-1 supplies positive supplemental current through the dynamic load 118-1 if the corresponding voltage is below a threshold level. Conversely, the power converter 121-1 supplies negative supplemental current through the dynamic load 118-1 if the corresponding voltage is above a threshold level. Without these current adjustments and prevention of the under-voltage and over-voltage conditions, the dynamic loads of system 100 could be damaged or not meet performance targets. Each of the power converters and corresponding controller operate in similar manner.

Figure 2:
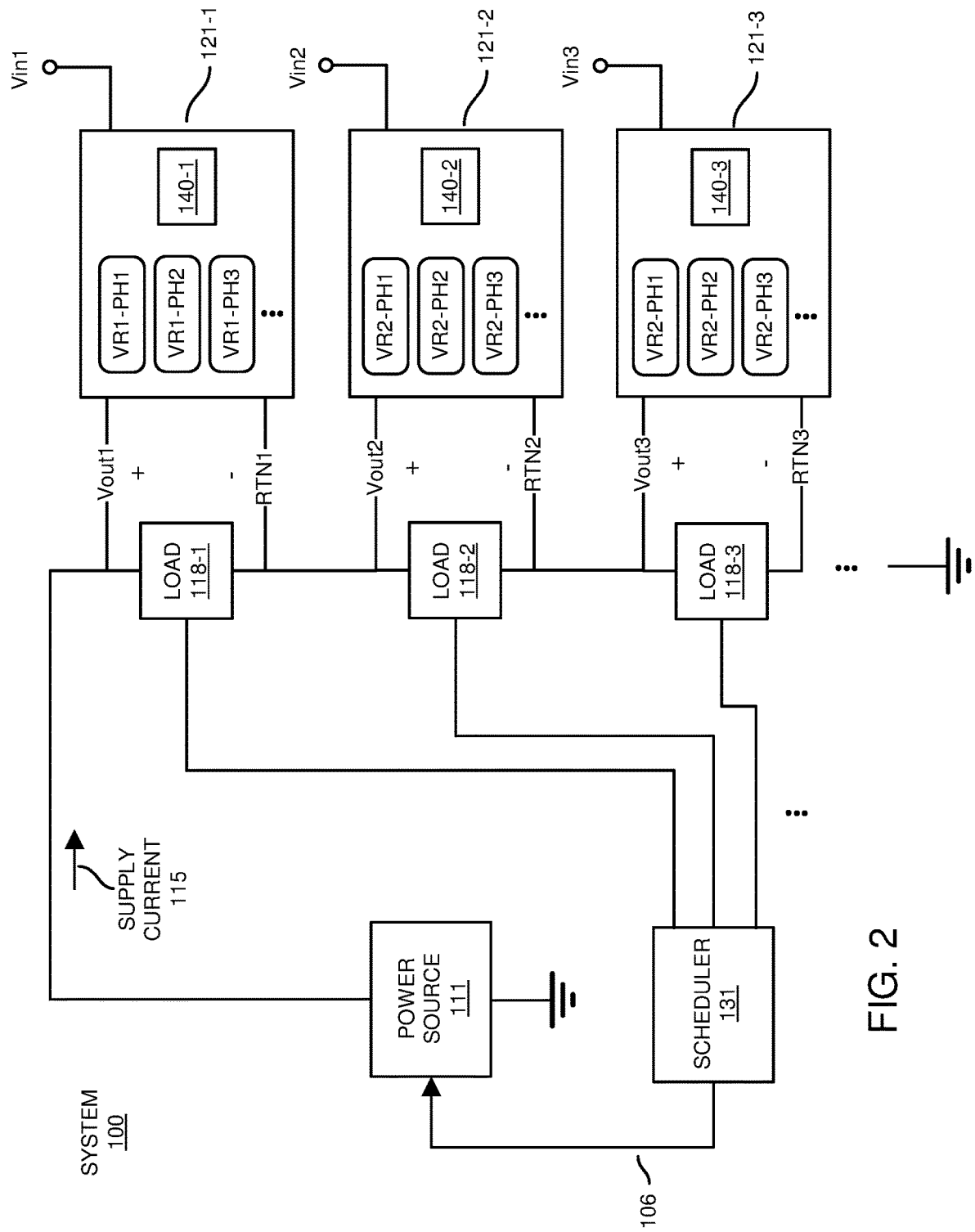
FIG. 2 is an example diagram illustrating implementation of multiple power converter phases per power converter according to embodiments herein.

FIG. 2 is an example diagram illustrating implementation of a power converter including multiple power converter phases to maintain the voltage across a respective dynamic load according to embodiments herein.

In this example embodiment, the power converter 121-1 includes controller 140-1 as well as corresponding multiple power converter phases VR1-PH1 (power converter phase 1), VR1-PH2 (power converter phase 2), VR1-PH3 (power converter phase 3), and so on.

In one embodiment, each of the power converter phases in the power converter 121-1 are operated out of phase with respect to each other.

Further, in this example embodiment, the power converter 121-2 includes controller 140-2 as well as corresponding multiple power converter phases VR2-PH1 (power converter phase 1), VR2-PH2 (power converter phase 2), VR2-PH3 (power converter phase 3), and so on.

In one embodiment, each of the power converter phases in the power converter 121-2 are operated out of phase with respect to each other.

Still further in this example embodiment, the power converter 121-3 includes controller 140-3 as well as corresponding multiple power converter phases VR3-PH1 (power converter phase 1), VR3-PH2 (power converter phase 2), VR3-PH2 (power converter phase 3), and so on.

In one embodiment, each of the power converter phases in the power converter 121-3 are operated out of phase with respect to each other.

Figure 3:
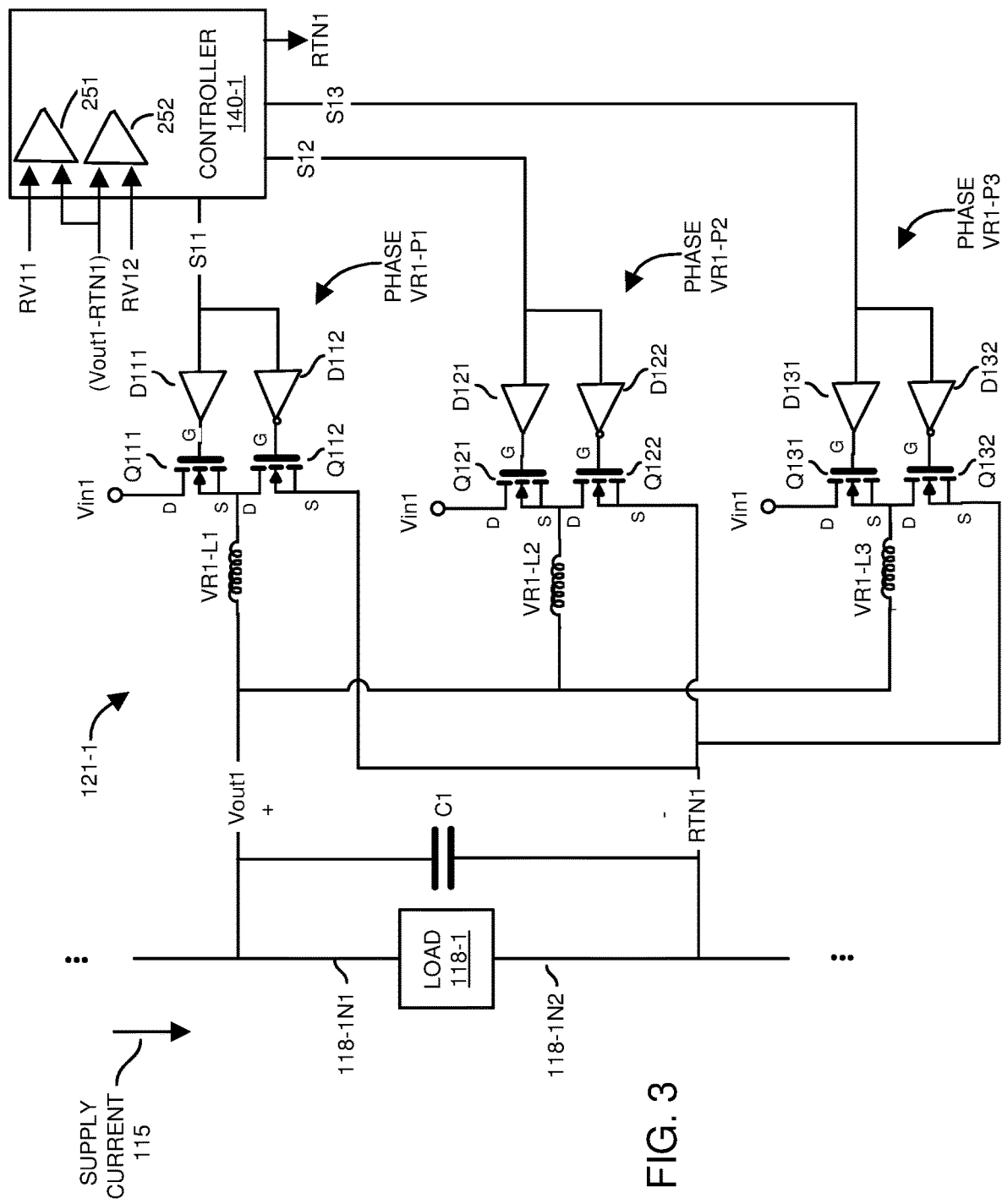
FIG. 3 is an example diagram illustrating a first power converter including multiple power converter phases that adjust current through a first dynamic load according to embodiments herein.

FIG. 3 is an example diagram illustrating a first power converter including multiple power converter phases that adjust current through a first dynamic load according to embodiments herein.

In one embodiment, the power converter in FIG. 3 is implemented by a multi-phase synchronous buck converter.

In this example embodiment, the power converter 121-1 includes capacitance C1 (such as one or more capacitors) and multiple power converter phases including power converter phase VR1-P1; power converter phase VR1-P2, and power converter phase VR1-P3. Note that the power converter 121-1 (a.k.a., VR1) can include any number of phases.

Power converter phase VR1-P1 includes inductor VR1-L1, switch Q111, switch Q112, driver D111, and driver D112. Note that any of the switches as discussed herein can be implemented in any suitable manner such as via MOSFETs, semiconductor material including GaN and SiC; and any power semiconductor including BJT, IGBT, JFET, etc.

The switch Q111 and switch Q112 are connected in series between the local input voltage Vin1 and the local (floating) ground reference RTN1. For example, the drain (D) of switch Q111 is connected to receive the input voltage Vin1; the source (S) of switch Q111 is connected to the drain (D) of switch Q112; the source (S) of switch Q112 is connected to the ground reference RTN1. Inductor VR1-L1 is connected between the node 118-1N1 and the source node of switch Q111, which is connected to the drain node of switch Q112 as previously discussed.

Power converter phase VR1-P2 includes inductor VR1-L2, switch Q121, switch Q122, driver D121, and driver D122. The switch Q121 and switch Q122 are connected in series between the local input voltage Vin1 and the local (floating) ground reference RTN1. For example, the drain (D) of switch Q121 is connected to the input voltage Vin1; the source (S) of switch Q121 is connected to the drain (D) of switch Q122; the source (S) of switch Q122 is connected to the ground reference RTN1. Inductor VR1-L2 is connected between the node 118-1N1 and the source node of switch Q121, which is connected to the drain node of switch Q122 as previously discussed.

Power converter phase VR1-P3 includes inductor VR1-L3, switch Q131, switch Q132, driver D131, and driver D132. The switch Q131 and switch Q132 are connected in series between the local input voltage Vin1 and the local (floating) ground reference RTN1. For example, the drain (D) of switch Q131 is connected to the input voltage Vin1; the source (S) of switch Q131 is connected to the drain (D) of switch Q132; the source (S) of switch Q132 is connected to the ground reference RTN1. Inductor VR1-L3 is connected between the node 118-1N1 and the source node of switch Q131, which is connected to the drain node of switch Q132 as previously discussed.

As previously discussed, the power source 111 produces supply current 115 that is destined to pass through the dynamic load 118-1. Ideally, the flow of supply current 115 through the dynamic load 118-1 results in a predetermined voltage drop (Vout1-RTN1). However, a magnitude of the corresponding dynamic load 118-1 may vary from an expected value as previously discussed.

In one embodiment, the controller 140-1 monitors one or more parameters of the power converter 121-1 (VR1) and the dynamic load 118-1 to determine whether to adjust an amount of current through the dynamic load 118-1. For example, in one embodiment, the controller 140-1 monitors the voltage Vout1-RTN1 and compares it to a reference voltage RV11 (such as upper voltage threshold level) via comparator 251. If the voltage Vout1-RTN1 crosses the reference voltage RV11 such as because the dynamic load 118-1 does not consume a sufficient amount of power, via implementation of negative supplemental current provided by the one or more power converter phases of power converter 121-1, the controller 140-1 activates one or more of the power converter phases in the power converter 121-1 to reduce the overall amount of current through the dynamic load 118-1. As further discussed herein in detail below, the controller 140-1 activates one or more of the power converter phases in the power converter 121-1 to control a magnitude of the voltage Vout1-RTN1 and prevent it from rising above a threshold level (such as the reference voltage RV11 or other suitable value).

Additionally, in one embodiment, the controller 140-1 monitors the voltage Vout1-RTN1 and compares it to a reference voltage RV12 (such as lower voltage threshold level) via comparator 252. If the voltage Vout1-RTN1 equals or crosses below the reference voltage RV12 such as because the dynamic load 118-1 requires more power than as provided by the supply current 115, to provide positive supplemental current by the one or more power converter phases of power converter 121-1, the controller 140-1 activates one or more of the power converter phases in the power converter 121-1 to increase the overall amount of current through the dynamic load 118-1. This prevents the monitored voltage Vout1-RTN1 from falling below the lower threshold level RV12.

Figure 4:
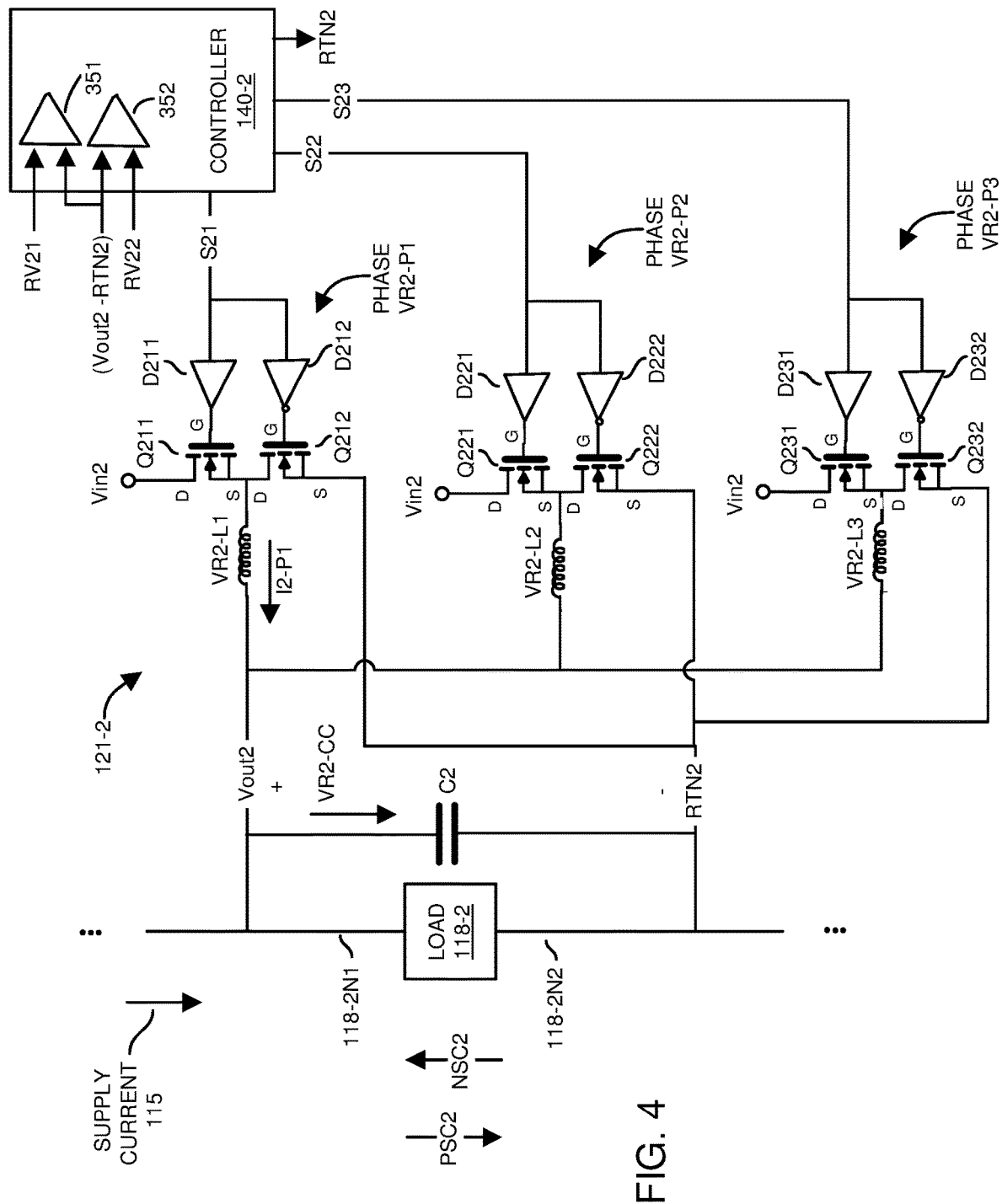
FIG. 4 is an example diagram illustrating a second power converter including multiple power converter phases that adjust current through a second dynamic load according to embodiments herein.

FIG. 4 is an example diagram illustrating a second power converter including multiple power converter phases that adjust current through a second dynamic load according to embodiments herein.

In this example embodiment, the power converter 121-2 includes capacitance C2 (such as one or more capacitors) and multiple power converter phases including power converter phase VR2-P1; power converter phase VR2-P2, and power converter phase VR2-P3. Note that the power converter 121-2 (a.k.a., VR2) can include any number of phases.

Power converter phase VR2-P1 includes inductor VR2-L1, switch Q211, switch Q212, driver D211, and driver D212. The switch Q211 and switch Q212 are connected in series between the local input voltage Vin1 and the local (floating) ground reference RTN1. The drain (D) of switch Q211 is connected to the input voltage Vin2; the source (S) of switch Q211 is connected to the drain (D) of switch Q212; the source (S) of switch Q212 is connected to the ground reference RTN2. Inductor VR2-L1 is connected between the node 118-2N1 and the source node of switch Q211, which is connected to the drain node of switch Q212 as previously discussed.

Power converter phase VR2-P2 includes inductor VR2-L2, switch Q221, switch Q222, driver D221, and driver D222. The switch Q221 and switch Q222 are connected in series between the local input voltage Vin2 and the local (floating) ground reference RTN2. The drain (D) of switch Q221 is connected to the input voltage Vin2; the source (S) of switch Q221 is connected to the drain (D) of switch Q222; the source (S) of switch Q222 is connected to the ground reference RTN2. Inductor VR2-L2 is connected between the node 118-2N1 and the source node of switch Q221, which is connected to the drain node of switch Q222 as previously discussed.

Power converter phase VR2-P3 includes inductor VR2-L3, switch Q231, switch Q232, driver D231, and driver D232. The switch Q231 and switch Q232 are connected in series between the local input voltage Vin2 and the local (floating) ground reference RTN2. The drain (D) of switch Q231 is connected to the input voltage Vin2; the source (S) of switch Q231 is connected to the drain (D) of switch Q232; the source (S) of switch Q232 is connected to the ground reference RTN2. Inductor VR2-L3 is connected between the Vout1 node and the source node of switch Q231, which is connected to the drain node of switch Q232 as previously discussed.

As previously discussed, the power source 111 produces supply current 115 that is destined to pass through the dynamic load 118-1. Ideally, the flow of supply current 115 through the dynamic load 118-2 results in a predetermined voltage drop (Vout2-RTN2). However, a magnitude of the corresponding dynamic load may vary from an expected value as previously discussed.

In one embodiment, the controller 140-2 monitors one or more parameters of the power converter 121-1 (VR2) and the dynamic load 118-2 to determine whether to adjust an amount of current through the dynamic load 118-2. For example, in one embodiment, the controller 140-2 monitors the voltage Vout2-RTN2 and compares it to a reference voltage RV21 via comparator 351. If the voltage Vout2-RTN2 crosses above the reference voltage RV21 such as because the dynamic load 118-2 does not consume a sufficient amount of power, the controller 140-2 activates one or more of the power converter phases in the power converter 121-2 to reduce the overall amount of current through the dynamic load 118-2. As further discussed herein in detail below, the controller 140-2 activates one or more of the power converter phases in the power converter 121-2 to prevent the voltage Vout2-RTN2 from rising above a threshold level (such as the reference voltage RV21 or other suitable value).

Additionally, in one embodiment, the controller 140-2 monitors the voltage Vout2-RTN2 and compares it to a reference voltage RV22 (such as lower voltage threshold level) via comparator 352. If the voltage Vout2-RTN2 equals or crosses below the reference voltage RV22 such as because the dynamic load 118-2 requires more power than as provided by the supply current 115, to provide positive supplemental current by the one or more power converter phases of power converter 121-2, the controller 140-2 activates one or more of the power converter phases in the power converter 121-2 to increase the overall amount of current through the dynamic load 118-2. This prevents the monitored voltage Vout2-RTN2 from falling below the lower threshold level RV22. As previously discussed, each of the power converters includes circuitry as shown in FIG. 4.

Figure 5:
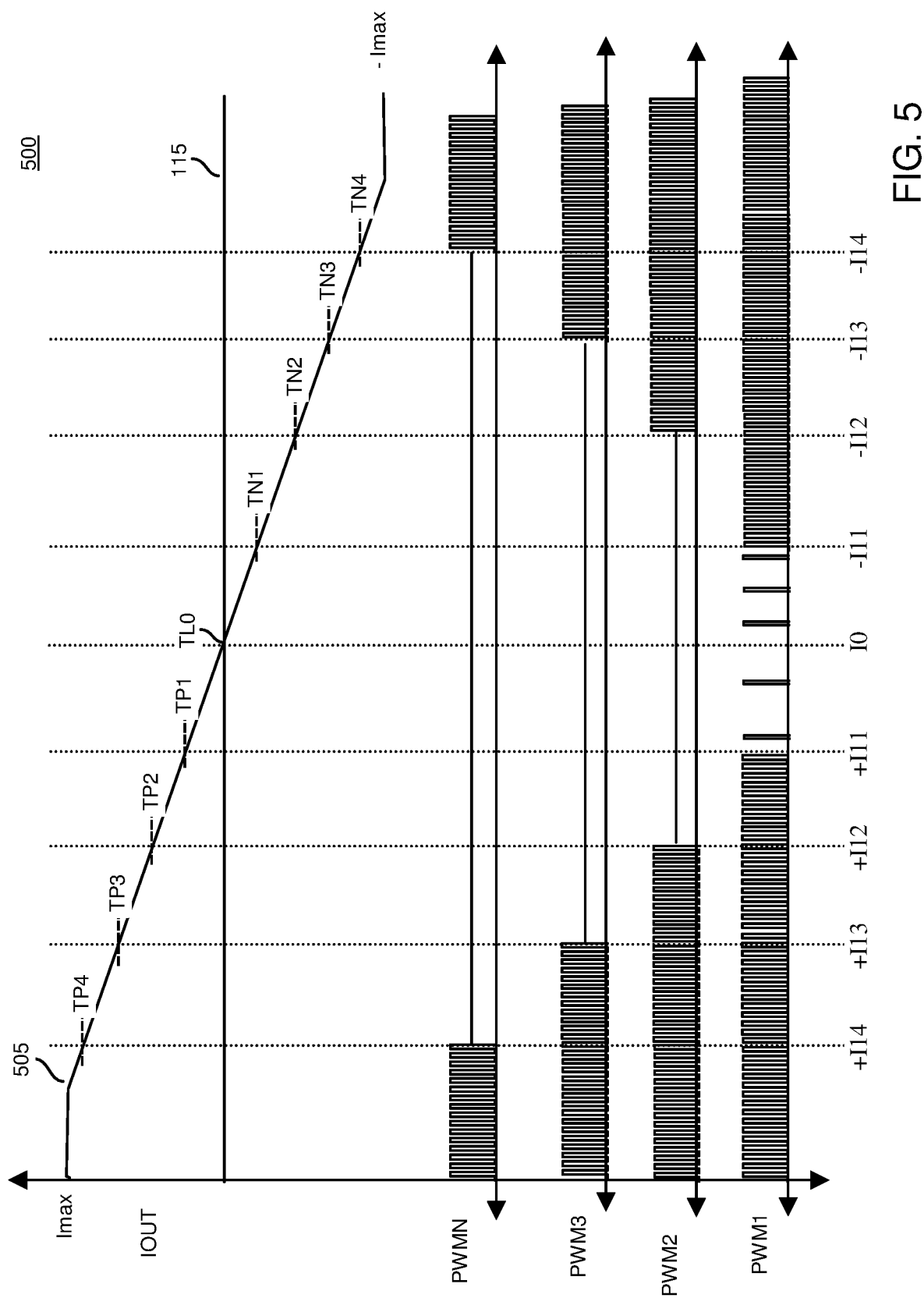
FIG. 5 is an example diagram illustrating phase control of multiple power converter phases over multiple ranges of different current adjustment settings applied to a respective dynamic load according to embodiments herein.

FIG. 5 is an example diagram illustrating phase control of multiple power converter phases over multiple ranges of different current adjustment settings according to embodiments herein.

As previously discussed, each of the dynamic loads is susceptible to requiring more or less power than as provided by the supply current 115. In such an instance, a respective power converter (such as including multiple power converter phases) provides current compensation (supplemental current 505 such as negative supplemental current or positive supplemental current) such that the voltage drop across the respective dynamic load is constant and nearer a desired predetermined fixed value. This adjustment prevents damage to the dynamic load, providing better performance.

In this example embodiment, assume that each power converter includes an integer value of N-power converter phases. In one embodiment, at positive maximum supplemental load current $I_{Max}$ (greater than threshold level TP4), all power converter phases of a respective power converter are activated in a continuous conduction mode (CCM) to supply additional current to the corresponding dynamic load consuming substantially more than the power provided by the supply current 115. Conversely, at negative maximum supplemental load current −IMax (such as less than TN4), all power converter phases are activated in a continuous conduction mode (CCM) to reduce an effective amount of current supplied to the corresponding dynamic load consuming substantially less than the power provided by the supply current 115.

In further example embodiments, reduction of the output current below various current thresholds as shown in graph 500 of FIG. 5 results in dropping the phases to save power. For example, as the supplemental current provided by the corresponding power converter approaches 0 Amps or I0 (note that I0 corresponds to a condition in which the supply current 115 provides an exact amount of required power to the corresponding dynamic load) the current crosses a PFM threshold (such as threshold level TP1, TP2, TP3, ..., TN1, TN2, TN3, etc.) and the remaining single phase transitions from CCM (Continuous Conduction Mode) to the DCM (Discontinuous Conduction Mode) when operating in conditions between positive supplemental current +I11 and negative supplemental current −I11.

Thus, in one embodiment, when a respective dynamic load requires supplemental current in a range between the positive supplemental current +I11 (threshold level TP) and negative supplemental current −I11 (threshold level TN1) in graph 500, the respective controller operates the single activated phase in a discontinuous conduction mode while other power converter phases are deactivated or tri-stated.

As a more specific example, for positive supplemental current required by the dynamic load 118-2 between +I11 and 0, a respective power converter can be configured to implement a so-called positive PFM (Pulse Frequency Mode) control sequence T_ON (switch Q211 turned ON for a time duration while switch Q212 is OFF), T_OFF (switch Q212 turned ON for a time duration while switch Q211 is OFF), and T_HiZ (switch Q211 turned OFF for a time duration while switch Q212 is also OFF). As will further be discussed in FIG. 7 between time T0 and time T6, the respective controller 140-2 operates in a discontinuous conduction mode, varying a frequency of applying pulses to the switches Q211 and Q212, to supply the supplemental current needed to regulate a magnitude of the voltage across dynamic load 118-2.

Note that under very light load conditions in which the respective dynamic load 118-2 requires very little extra supplemental current, it is possible that it is more efficient to keep the corresponding low side switch Q212 of a power converter OFF and occasionally activate the high-side switch Q211, letting the current decay through the anti-parallel body diode of a respective switch. This would result in a positive PFM cycle implemented as TON→THiZ without a TOFF interval (of activating switch Q212).

Note that the magnitude of the current required by the dynamic load 118-2 in FIG. 5 may be greater than +I11 (such as between +I11 and +I14). In such an instance, according to conventional techniques, the respective control activates additional phases on a continuous conduction mode to supply appropriate extra current through the dynamic load 118-2 depending on the amount of supplemental current required to maintain the magnitude of the voltage across the dynamic load 118-2 within a desired range.

For negative supplemental current required by the dynamic load 118-2 between −I11 and 0, a respective power converter can be configured to implement a so-called negative PFM (Pulse Frequency Mode) control sequence T_OFF (switch Q212 turned ON for a time duration while switch Q211 is OFF), T_ON (switch Q211 turned ON for a time duration while switch Q212 is OFF), and T_HiZ (switch Q211 turned OFF for a time duration while switch Q212 is also OFF). As will further be discussed in FIG. 7 between time T6 and time T12, the respective controller 140-2 operates in a discontinuous conduction mode, varying a frequency of applying cycles of pulses to the switches Q211 and Q212, to supply the negative supplemental current needed to regulate a magnitude of the voltage across dynamic load 118-2.

Under very light load conditions in which the respective dynamic load 118-2 requires very little negative supplemental current, it is possible that it is more efficient to keep the corresponding high side switch Q211 of a power converter OFF and occasionally activate the low-side switch Q212 (a.k.a., TOFF→THiZ), letting the current decay through the anti-parallel body diode of a respective switch. This would result in a positive PFM cycle implemented as TOFF→THiZ without a TON interval (of activating switch Q211). Assume in a further example embodiment that the dynamic load 118-2 (see also FIG. 4) requires less power than as provided by the supply current 115 and that the amount of needed negative supplemental current falls between I0 (threshold level TL0) and −I11 (threshold level TN1), in which the dynamic load 118-2 requires negative supplemental current in a range between 0 and TN1 amps as shown in FIG. 5 to maintain regulation.

In one embodiment, while in this range between I0 and −I11 (such as relatively low negative supplemental current), the controller 140-2 deactivates (via tri-stating) power converter phases VR2-P2, VR2-P3, etc., and activates only power converter phase VR2-P1 in the discontinuous conduction mode. The controller 140-2 operates the power converter phase VR2-P1 in a discontinuous conduction mode in which the controller 140-2 produces the control signal S21 (see also FIG. 4) to activate switch Q212 for a duration of time (a.k.a., $T_{OFF}$) and then enters the tri-sate mode in which neither of switches Q211 and Q212 are activated for each control cycle. Thus, the switch Q211 is skipped from being activated in such a mode. Implementation of the discontinuous conduction mode between while providing negative supplemental current 0 (TL0) and TN1 amperes enables high power conversion efficiency and very fine tuning of reducing the overall amount of current through the dynamic load 118-2.

Further, while in the range between I0 and −I11 (TL0 to TN1), the frequency of repeating the control cycle of activating the low-side switch Q212 ($T_{OFF}$) and deactivating both switches Q211 and Q212 ($T_{HiZ}$) varies depending on a magnitude of the negative supplemental current through the dynamic load 118-2 needed to maintain the voltage across the dynamic load 118-2 at a desired value.

This same concept could be applied to positive PFM. As the current magnitude decreases, the gate loss incurred by switching the low-side FET represents a greater portion of total loss. The positive PFM interval can be modified to remove $T_{OFF}$ (activation of the low-side switch Q211) so that the low-power PFM cycle is implemented as $T_{ON} \rightarrow T_{HiZ}$.

As a more specific example, assume that the dynamic load 118-2 requires more power than as provided by the supply current 115 and that the amount of positive supplemental current needed to maintain regulation falls between I0 and +I1 (in which the dynamic load 118-2 requires positive supplemental current) in a range between TL0 (zero) and TP1 amps as shown in FIG. 5. In one embodiment, while in this range, the controller 140-2 deactivates power converter phases VR2-P2, VR2-P3, etc., and activates power converter phase VR2-P1. The controller 140-2 operates the power converter phase VR2-P1 in a discontinuous conduction mode in which the controller 140-2 produces the control signal S21 to activate switch Q211 (high-side switch) for a duration of time (a.k.a., $T_{ON}$) and then enters the tri-sate mode when neither of switches Q211 and Q212 are activated for each control cycle. Thus, the switch Q212 (low-side switch) is skipped from being activated in such a positive supplemental current mode.

Further, while in the range between I0 and +I11, the frequency of repeating the control cycle of activating the low-side switch Q212 ($T_{OFF}$) and deactivating both switches Q211 and Q212 ($T_{HiZ}$) varies depending on a magnitude of the negative supplemental current through the dynamic load 118-2 needed to maintain the voltage across the dynamic load 118-2 at a desired value.

From $I_{Max}$ to 0 A (a.k.a., I0), the behavior of the corresponding Local power converter associated with a dynamic load is identical to a standard power converter. However, in one embodiment, the difference occurs during negative current conditions in which the supply current 115 supplies more power than is consumed by the dynamic load. In a normal power converter, the dynamic load cannot reduce below zero; however, the load of a Local VR is affected by neighboring Local VRs. This means if VR1 is operating in PFM and VR2 increases in load current, the Main VR will increase it's output, forcing VR1 to supply less current.

Note further that, as previously discussed herein, it is possible that negative supplemental current through the dynamic load is required to maintain regulation. This is shown in FIG. 5 between I0 and −I14. In one embodiment, when operating with negative supplemental current, the behavior of the corresponding VR is analogous to the standard case where increasing negative current results in the transition from PFM (for the first phase when negative supplemental current applied to the dynamic load is between $I0$ and $-I1$) to CCM (continuous conduction mode when the negative supplemental current applied to the dynamic load is between $-I1$ and $-I2$), and then the addition of phases (such as when the magnitude of the negative supplemental current between $-I2$ and $-I4$). In one embodiment, all $N_{ph}$ phases are active when $|I_{OUT}|>|-I4|$.

Implementation of conventional power converter and controllers applied to stacked dynamic loads have drawbacks. As an example, consider a system where the Main VR providing the supply current 115 has 5-power converter phases operating at 500 kHz switching frequency, and the four Local power converters have 3-phases operating at 800 kHz. The system behavior under various loading conditions of such a system are presented in Table 1 below. Note that the examples below are non-exhaustive, but sufficient to highlight the merit of the proposed control scheme.

TABLE 1

Comparison of system operation under different loading conditions

| Processor Core Loading Conditions | Operation with Conventional VR Controllers | Operation with Proposed Controller Behavior |
|---|---|---|
| 1. Full-Load Imbalance: 2x Cores at $I_{Max}$, 2x Cores at 0A | Main VR: 3-phases supplying 50% $I_{Max}$ Local VRs: 2x 3-phases supplying 50% $I_{Max}$ (buck), 2x 3-phase sinking 50% $I_{Max}$ (boost) TOTAL: 15 phases switching | Main VR: 3-phases supplying 50% $I_{Max}$ Local VRs: 2x 3-phases supplying 50% $I_{Max}$ (buck), 2x 3-phase sinking 50% $I_{Max}$ (boost) TOTAL: 15 phases switching |
| 2. Half-Load Imbalance: 2x Cores at 75% $I_{Max}$, 2x Cores at 25% $I_{Max}$ | Main VR: 3-phases supplying 50% $I_{Max}$ Local VRs: 2x 3-phases supplying 25% $I_{Max}$ (buck), 2x 3-phase sinking 25% $I_{Max}$ (boost) TOTAL: 15 phases switching | Main VR: 3-phases supplying 50% $I_{Max}$ Local VRs: 2x 2-phases supplying 25% $I_{Max}$ (buck), 2x 2-phase sinking 25% $I_{Max}$ (boost) TOTAL: 11 phases switching |
| 3. Quarter-Load Imbalance 2x Cores at 50% $I_{Max}$, 2x Cores at 25% $I_{Max}$ | Main VR: 2-phases supplying 37.5% $I_{Max}$ Local VRs: 2x 3-phases supplying 12.5% $I_{Max}$ (buck), 2x 3-phase sinking 12.5% $I_{Max}$ (boost) TOTAL: 15 phases switching | Main VR: 2-phases supplying 37.5% $I_{Max}$ Local VRs: 2x 1-phases supplying 12.5% $I_{Max}$ (buck), 2x 1-phase sinking 12.5% $I_{Max}$ (boost) TOTAL: 6 phases switching |
| 4. Cores Effectively Balanced within 15% of Max ≥2x Cores at $I_{Max}$, remaining cores ≥85% $I_{Max}$ | Main VR: 5-phases supplying (effectively) $I_{Max}$ Local VRs: ≥2x 3-phases supplying ≤ 7.5% $I_{Max}$ (buck), remaining VRs 3-phase sinking ≤ 7.5% $I_{Max}$ (boost) TOTAL: 15 phases switching | Main VR: 5-phases supplying (effectively) Max Local VRs: ≥2x 1-phases supplying ≤ 7.5% $I_{Max}$ (buck), 2x 1-phase sinking 7.5% $I_{Max}$ (boost) TOTAL: 9 phases switching, with possibility of 4 being in PFM |
| 5. Cores Effectively Balanced within 5% to 10% $I_{Max}$ 2x Cores at 15% $I_{Max}$ 2x cores at 5% $I_{Max}$ | Main VR: 1-phase supplying (effectively) 10% $I_{Max}$ Local VRs: 2x 3-phases supplying 5% $I_{Max}$ (buck), 2x 3-phase sinking 5% $I_{Max}$ (boost) Total: 13 phases switching | Main VR: 1-phase supplying (effectively) 10% $I_{Max}$ Local VRs: 2x 1-phases supplying 5% $I_{Max}$ (buck)in PFM, 2x 1-phase sinking 5% $I_{Max}$ (boost) in PFM TOTAL: 5 phases switching, at least 4 in PFM |

CM Transition Across 0 A

Note that, in the CCM (continuous conduction mode), the transition from positive to negative supplemental current, and vice versa, is relatively straight-forward as shown in graph 500 of FIG. 5. In one embodiment, while in the continuous conduction mode, PFM is never entered, and any phase count can transition to either side of 0 A. The novelty of such embodiments is the ability to cross 0 A (I0) with a reduced phase count and increase phase count as necessary as the magnitude of the required supply current increases, regardless of whether the needed supply current is positive or negative.

Thus, when a magnitude of the negative supplemental current required by the dynamic load 118-2 falls in range between I0 (TL0 or zero supplemental current) and −I11 (TN1), the controller 140-2 at least temporarily operates the first power converter phase VR2-P1 of the multiple power converter phases in power converter 121-2 in a variable switching frequency mode (varying a switching frequency of controlling switch Q212) to regulate the magnitude of the voltage across the dynamic load 118-2. In such an instance, the controller 140-2 at least temporarily operates a first power converter phase VR2-P1 (such as via control signal PWM1) of the multiple power converter phases in a discontinuous conduction mode to regulate the magnitude of the voltage below (Vout2-RTN2) below a threshold level.

With further reference to FIGS. 4 and 5, the dynamic load 118-2 receives supply current 115 from the first dynamic load 118-1 of the multiple dynamic loads disposed in series. In such an instance, the controller 140-2 varies how many of the multiple phases in the power converter 121-2 are activated to regulate the voltage (Vout2-RTN2) powering the dynamic load 118-2. In one embodiment, this control includes sequentially activating additional power converter phases over time in response to a condition in which the dynamic load consumes less current over time. In other words, as previously discussed, when the dynamic load 118-2 requires less and less power over time, the controller 140-2 activates more and more phases to produce increased magnitude of negative supplemental current.

As yet a further example, in one embodiment, for a first time duration, when the magnitude of the negative supplemental current required by the dynamic load 118-2 falls between I0 (TL0) and −I11 (TN1), the controller 140-2 operates the first power converter phase VR2-P1 of the multiple power converter phases in a discontinuous conduction mode to maintain a magnitude of the voltage (Vout2-RTN2) powering the dynamic load 118-2. For a second duration following the first time duration, when the magnitude of the negative supplemental current required by the dynamic load 118-2 falls between −I11 (TN1) and −I12 (TN2), the controller 140-2 operates the first power converter phase VR2-P1 in a continuous conduction mode to regulate the magnitude of the voltage (Vout2-RTN2) powering the dynamic load 118-2. For a third duration following the second time duration, when the magnitude of the negative supplemental current required by the dynamic load 118-2 falls between −I12 (TN2) and −I13 (TN3), the controller 140-2 operates both the first power converter phase VR2-P1 and the second power converter phase VR2-P2 of the multiple power converter phases in the continuous conduction mode to regulate the magnitude of the voltage (Vout2-RTN2) across dynamic load 118-2.

Note that the magnitude of the positive supplemental current threshold levels and negative supplemental current threshold levels are not necessarily symmetrical. For example, the threshold level +I12 may be set at 18 Amps. Switchover from activating one phase to activating two phases occurs when the positive supplemental increases from +17 Amps to +19 Amps. Conversely, the threshold level −I12 may be set at −14 Amps. Switchover from activating one phase to activating two phases occurs when the negative supplemental current decreases from −13 Amps to −15 Amps.

Figure 6:
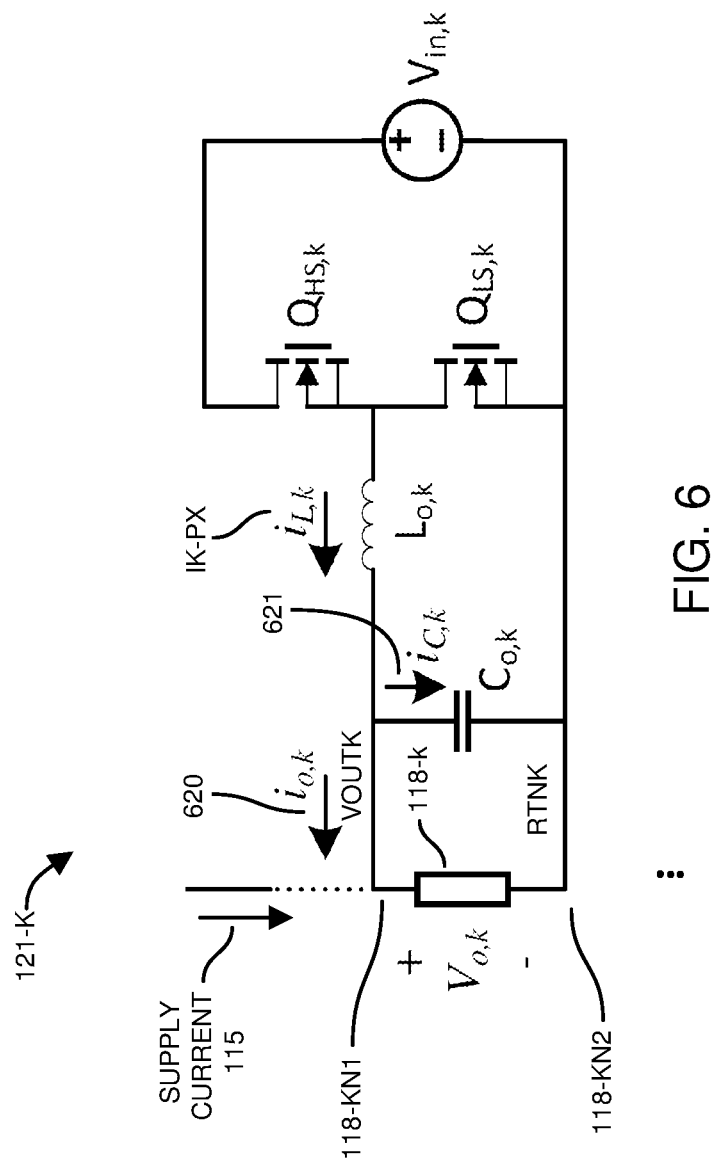
FIG. 6 is an example diagram illustrating a power converter operative to produce positive supplemental current or negative supplemental current through a dynamic load according to embodiments herein.

FIG. 6 is an example diagram illustrating a power converter operative to produce positive supplemental current or negative supplemental current according to embodiments herein.

This example embodiment illustrates a $K^{th}$ power converter 121 supplying respective supply current 620 (such as positive supplemental current or negative supplemental current) to the corresponding dynamic load 118-K (where K is an integer value). Current 621 (I c,k) represents current through the output capacitor Ck. Current IK-PX represents current through the corresponding inductor $L_{O,K}$ of the power converter 121-K.

Figure 7:
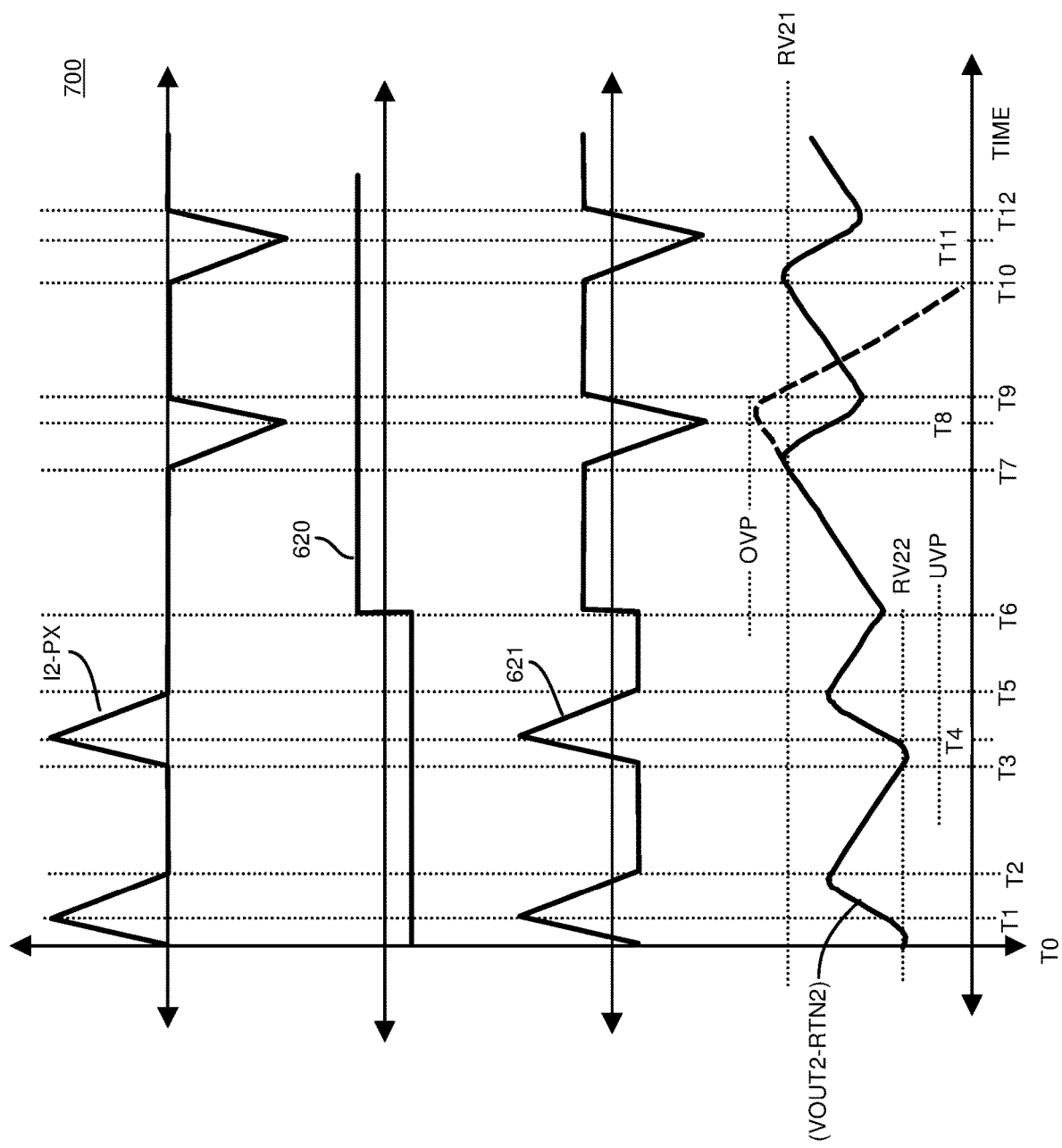
FIG. 7 is an example timing diagram illustrating implementation of control signals controlling operation of a power converter according to embodiments herein.

FIG. 7 is an example timing diagram illustrating control signals controlling operation of a power converter according to embodiments herein.

As previously discussed, embodiments herein include an apparatus and/or system including a controller. The controller monitors a magnitude of a voltage powering a respective dynamic load. The respective dynamic load is one of multiple dynamic loads disposed in series. The controller compares the magnitude of the voltage to one or more reference voltages. Based on results of the comparing, the controller controls operation of multiple power converter phases in a power converter to maintain a magnitude of the voltage supplied to the dynamic load.

Assume in this example embodiment that the power converter 121-2 monitors the dynamic load 118-2 and that graph 700 represents signals associated with the power converter 121-2.

In one embodiment, as previously discussed, the reference voltage RV21 is a threshold level implemented by the controller 140-2 to regulate the voltage Vout2-RTN2. For example, the controller 140-2 controls operation of the multiple power converter phases associated with the power converter 121-2 such that the magnitude of the voltage (Vout2-RTN2) does not increase above the threshold level (RV21). In one embodiment, this regulation prevents occurrence of an over-voltage trip condition in which a magnitude of the dynamic load voltage (Vout2-RTN2) becomes greater than a magnitude of the over-voltage threshold level OVP (such as an OVP reference voltage).

As previously discussed, the power converter associated with each of the respective dynamic loads adjusts a magnitude of respective supplemental current (such as positive supplemental current PSC2 or negative supplemental current NSC2) supplied to the dynamic load on an as-needed basis such that that voltage across the respective dynamic load remains within a desired range between RV21 and RV22. As previously discussed, in one embodiment, the controller associated with each power converter varies a number of the multiple power converter phases that are simultaneously activated to properly adjust the current through the respective dynamic load. The simultaneous activation of the multiple power converter phases regulates the voltage such that the voltage across each dynamic load generally stays within range between RV11, RV12, RV21, RV22, etc.

The timing diagram 700 in FIG. 7 illustrates supply of inductor current I2-PX (a phase X of the power converter 121-2) through a respective power converter phase of the power converter 121-2. Supply current 620 represents an amount of supplemental current needed to maintain the voltage across the dynamic load 118-2 within a desired range. Positive supplemental current is needed before time T6; negative supplemental current is needed after time T6 to regulate the magnitude of the voltage across the dynamic load 118-2.

Current 621 (or VR2 CC in FIG. 4) in timing diagram 700 represents an amount of current through the corresponding output capacitor C2 for the power converter 121-2. As further shown, a magnitude of the voltage (Vout2-RTN2) across the dynamic load 118-2 varies over time.

From time T0 to T6, when supplying positive supplemental current from the power converter 121-1 in the same direction as supply current 115, the power converter 121-2 operates in standard PFM and/or continuous conduction mode. At or around time T0, the controller 140-2 detects that the voltage (Vout2-RTN2) across the dynamic load 118-2 falls or is about to fall below a respective threshold value RV22. To prevent the voltage across the dynamic load 118-2 from falling below the RV22 threshold level, the controller 140-2 activates the power converter 121-1 to supply positive supplemental current to the dynamic load 118-2. More specifically, the controller 140-2 operates in a mode in which the high-side switch Q211 is ON and low-side switch Q212 is OFF between T0 and T1 (causing the magnitude of the voltage Vout2-RTN2 to increase above the UVP threshold level); the high-side switch Q211 is OFF and low-side switch Q212 is ON between T1 and T2; and the high-side switch Q211 is tri-stated and low-side switch Q212 is tri-stated between T2 and T3 (causing the magnitude of the voltage Vout2-RTN2 to decrease). Thus, as previously discussed, embodiments herein include sequence T_ON→T_OFF→T_HiZ, where T_ON (between T0 and T1) represents only the high-side switch being ON; where T_OFF (between T1 and T2) represents only the low-side switch being ON; where T_HiZ (between T2 and T3) represents both high and low-side switch OFF.

Similarly, for a next control cycle between T3 and T6 when positive supplemental current is still needed, the power converter 121-2 operates in standard PFM and/or continuous conduction mode, in which the high-side switch Q211 is ON and low-side switch Q212 is OFF between T3 and T4 (causing the magnitude of the voltage Vout2-RTN2 to increase); the high-side switch Q211 is OFF and low-side switch Q212 is ON between T4 and T5; and the high-side switch Q211 is tri-stated and low-side switch Q212 is tri-stated between T5 and T6 (causing the magnitude of the voltage Vout2-RTN2 to decrease).

As previously discussed, if desired, the power converter 121-2 can be configured to operate one or more power converter phases (such as out of phase with respect to each other) to supply the positive supplemental current through dynamic load 118-2 to maintain the corresponding voltage Vout2-RTN2 to be a desired value.

At or around time T6, note that the dynamic load 118-2 switches from needing positive supplemental current to needing negative supplemental current because the supply current 115 would provide too much energy to the dynamic load 118-2. In other words, the dynamic load 118-2 consumes less power than expected.

From time T6 to T12 and potentially beyond, when supplying negative supplemental current from the power converter 121-1 which is in the opposite direction as supply current 115, the power converter 121-2 operates in negative PFM and/or continuous conduction mode, in which the high-side switch Q211 is OFF and low-side switch Q212 is ON between T7 and T8 (causing the magnitude of the voltage Vout2-RTN2 to decrease and prevent the voltage Vout2-RTN2 from rising above the reference voltage RV21 and over-voltage limit reference voltage OVP); the high-side switch Q211 is ON and low-side switch Q212 is OFF between T8 and T9; and the high-side switch Q211 is tri-stated and low-side switch Q212 is tri-stated between T9 and T10 (causing the magnitude of the voltage Vout2-RTN2 to increase again). Thus, as previously discussed, embodiments herein include sequence T_OFF→T_ON→T_HiZ, where T_OFF (between T7 and T8) represents only the low-side switch being ON; where T_ON (between T8 and T9) represents only the high-side switch being ON; where T_HiZ (between T9 and T10) represents both high and low-side switch OFF.

Similarly, the power converter 121-2 operates in standard PFM and/or continuous conduction mode in a next control cycle, in which the high-side switch Q211 is OFF and low-side switch Q212 is ON between T10 and T11 (causing the magnitude of the voltage Vout2-RTN2 to decrease and prevent the voltage Vout2-RT2 from rising above the reference voltage RV21 and over-voltage limit voltage OVP); the high-side switch Q211 is ON and low-side switch Q212 is OFF between T11 and T12; and the high-side switch Q211 is tri-stated and low-side switch Q212 is tri-stated between T12 and T13 (causing the magnitude of the voltage Vout2-RTN2 to increase again).

As previously discussed, if desired, the power converter 121-2 can be configured to operate one or more power converter phases in the so-called continuous conduction mode (such as out of phase with respect to each other) to supply the negative supplemental current through dynamic load 118-2 to maintain the corresponding voltage Vout2-RTN2 to be a desired value. In one embodiment, each of the power converter phases in the power converter is able to provide a limited amount of negative supplemental current. As the power consumption of the dynamic load 118-2 drops more and more, and the excess power associated with supply current 115 increases, the power converter 121-2 activates an appropriate number of additional power converter phases to produce the increased negative supplemental current. As previously discussed, operation in the continuous conduction mode can include vary a time period between respective control cycles (such as between T0-T3, T3-T6, T7-T10, and so on.

Figure 8:
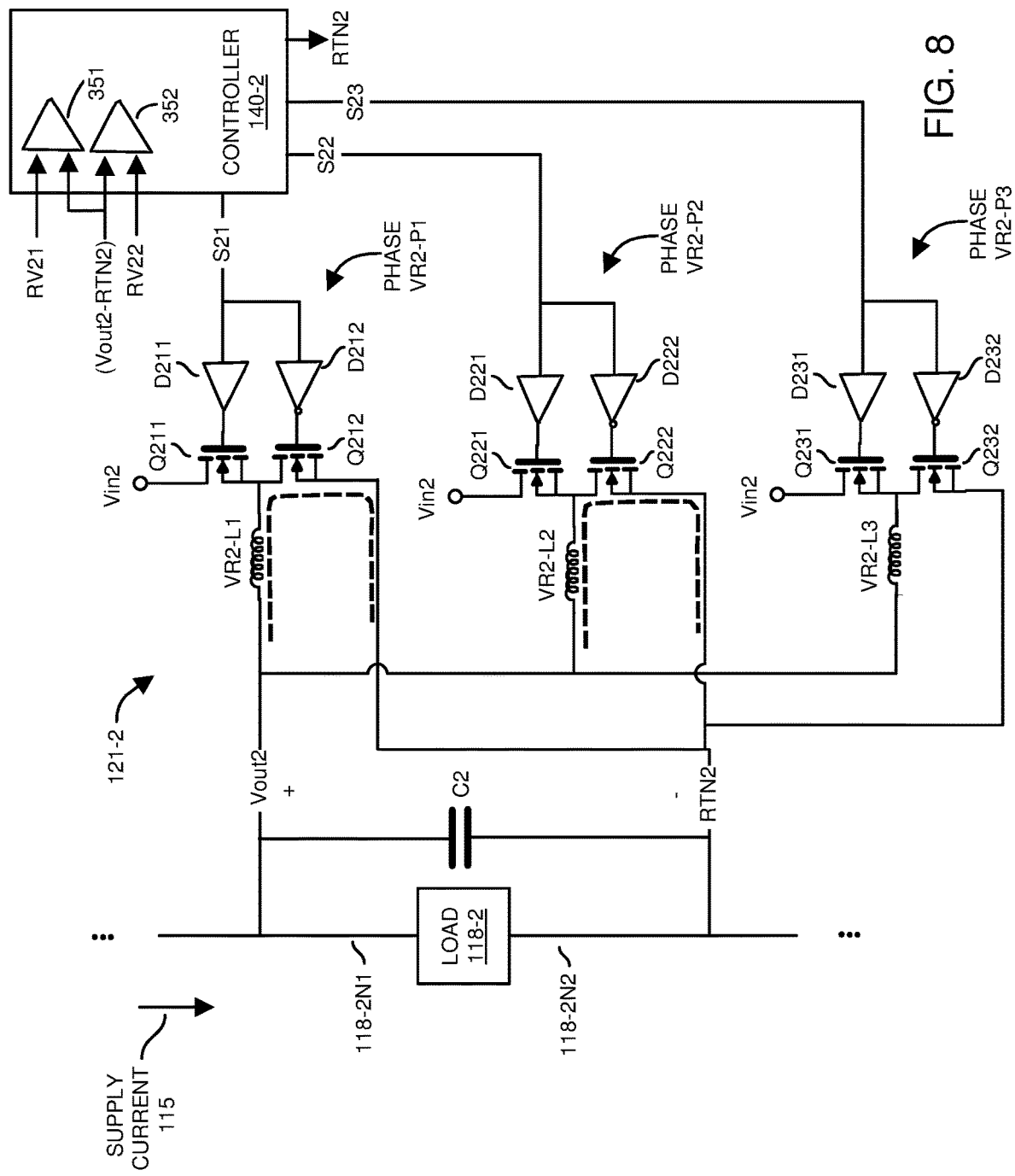
FIG. 8 is an example diagram illustrating activation of multiple power converter phases at different times during a respective control cycle to reduce an effective current through a respective dynamic load according to embodiments herein.

FIG. 8 is an example diagram illustrating activation of multiple power converter phases at different times during a respective control cycle to reduce current through a respective dynamic load according to embodiments herein.

As previously discussed, each of the multiple power converter phases as discussed herein supports bidirectional supplemental current flow. For example, if more current is needed to properly power the dynamic load because the power supplied by supply current 115 is insufficient to power the dynamic load, that respective power converter supplies the additional current needed to power the dynamic load. If less current is needed to properly power the dynamic load because the power supplied by supply current 115 is more than sufficient to power the dynamic load, that power converter provides a negative supplemental current to reduce current through the dynamic load. In a similar manner, each of the multiple power converter phases can be operated to supply positive or negative current through the respective dynamic load.

As shown in FIG. 7, activation of the low-side switches Q212, Q222, etc., at different phase delay times in a respective control cycle results in temporarily disposing the series circuit path including inductor VR2-L1 in parallel with the dynamic load 118-2 between the node 118-2N1 and node 118-2N2. In such an instance, at least a portion of the supply current 115 bypasses going through the dynamic load 118-2. As previously discussed, implementation of the negative supplemental current reduces an overall effective amount of current through the dynamic load 118-2.

Figure 9:
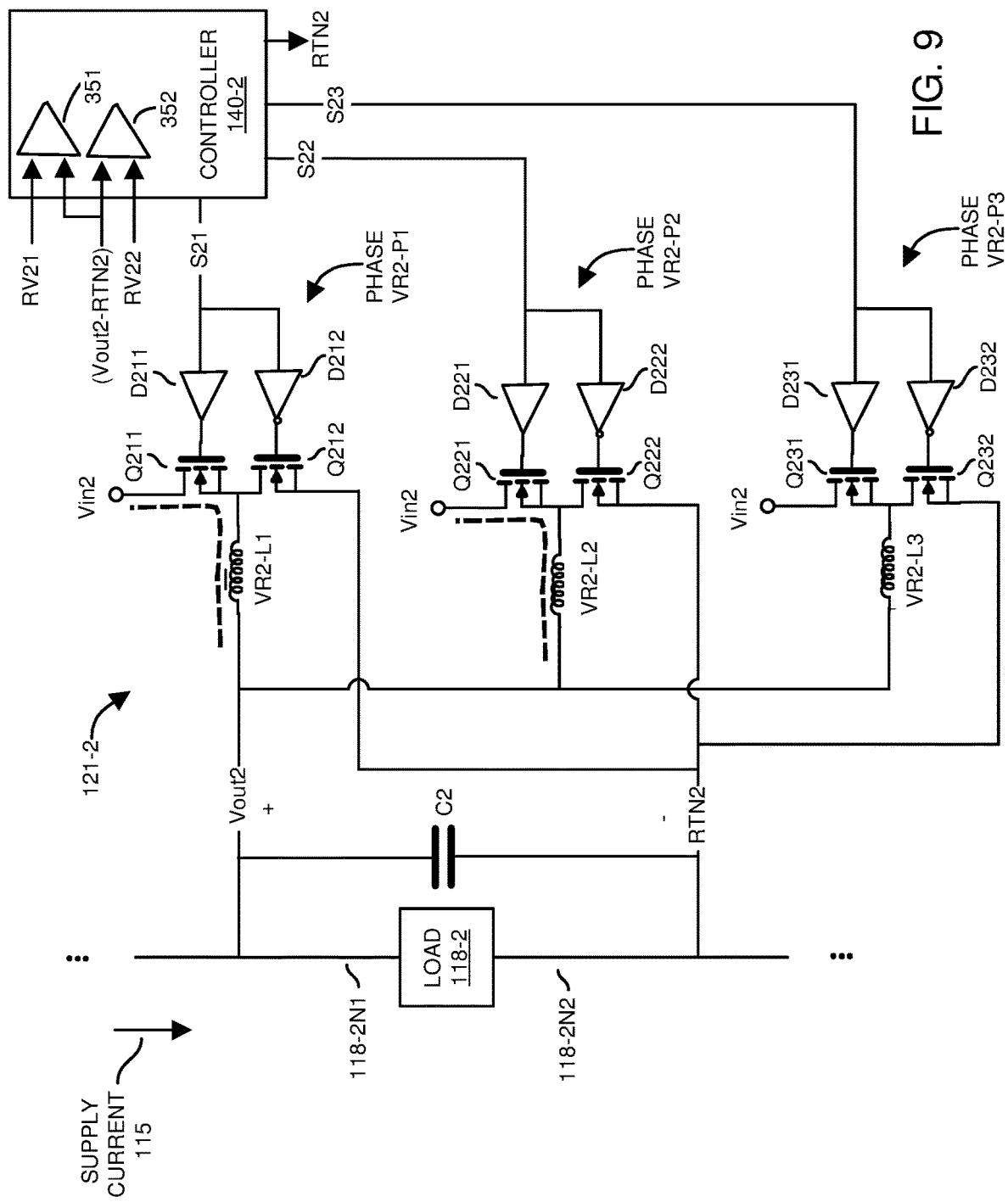
FIG. 9 is an example diagram illustrating activation of multiple power converter phases at different times during a respective control cycle to reduce an effective current through a respective dynamic load according to embodiments herein.

FIG. 9 is an example diagram illustrating activation of multiple power converter phases at different times during a respective control cycle to reduce current through a respective dynamic load according to embodiments herein.

As shown in FIG. 9, activation of the high-side switches Q211, Q212, etc., at different times in a respective control cycle results in disposing the inductor VR2-L1 between node 118-2N1 and the input voltage node Vin2.

Figure 10:
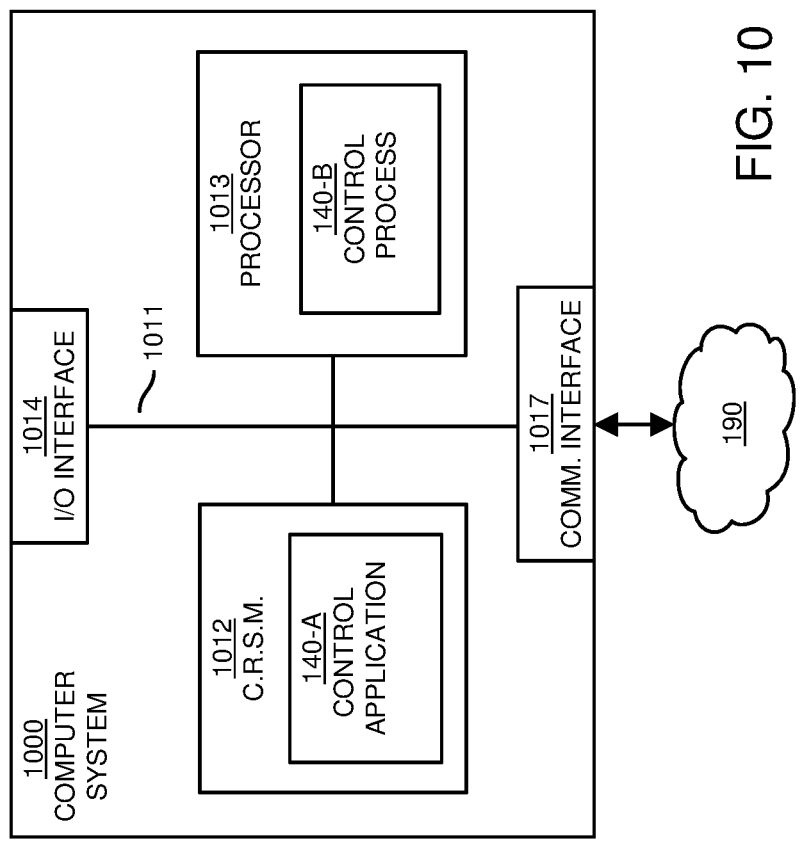
FIG. 10 is an example diagram illustrating computer processor hardware and related software instructions that execute methods according to embodiments herein.

FIG. 10 is an example block diagram of a computer device for implementing any of the operations as discussed herein according to embodiments herein.

As shown, computer system 1000 (such as implemented by any of one or more resources such as each of controllers 140, power converter, etc.) of the present example includes an interconnect 1011 that couples computer readable storage media 1012 such as a non-transitory type of media (or hardware storage media) in which digital information can be stored and retrieved, a processor 1013 (e.g., computer processor hardware such as one or more processor devices), I/O interface 1014 (e.g., to output control signals to the power converter phases, monitor current, etc.), and a communications interface 1017.

I/O interface 1014 provides connectivity to any suitable circuitry such as power converter phases.

Computer readable storage medium 1012 can be any hardware storage resource or device such as memory, optical storage, hard drive, floppy disk, etc. In one embodiment, the computer readable storage medium 1012 stores instructions and/or data used by the controller application 140-A (such as implemented by any of controllers 140-1, 140-2, 140-3, etc.) to perform any of the operations as described herein.

Further in this example embodiment, communications interface 1017 enables the computer system 1000 and processor 1013 to communicate over a resource such as network 190 to retrieve information from remote sources and communicate with other computers.

As shown, computer readable storage media 1012 is encoded with controller application 140-A (e.g., software, firmware, etc.) executed by processor 1013. Controller application 140-A can be configured to include instructions to implement any of the operations as discussed herein.

During operation of one embodiment, processor 1013 accesses computer readable storage media 1012 via the use of interconnect 1011 in order to launch, run, execute, interpret or otherwise perform the instructions in controller application 140-A stored on computer readable storage medium 1012.

Execution of the controller application 140-A produces processing functionality such as controller process 140-B in processor 1013. In other words, the controller process 140-B associated with processor 1013 represents one or more aspects of executing controller application 140-A within or upon the processor 1013 in the computer system 1000.

In accordance with different embodiments, note that computer system 1000 can be a micro-controller device, logic, hardware processor, hybrid analog/digital circuitry, etc., configured to control a power supply and perform any of the operations as described herein.

Functionality supported by the different resources will now be discussed via flowchart in FIG. 11. Note that the steps in the flowcharts below can be executed in any suitable order.

Figure 11:
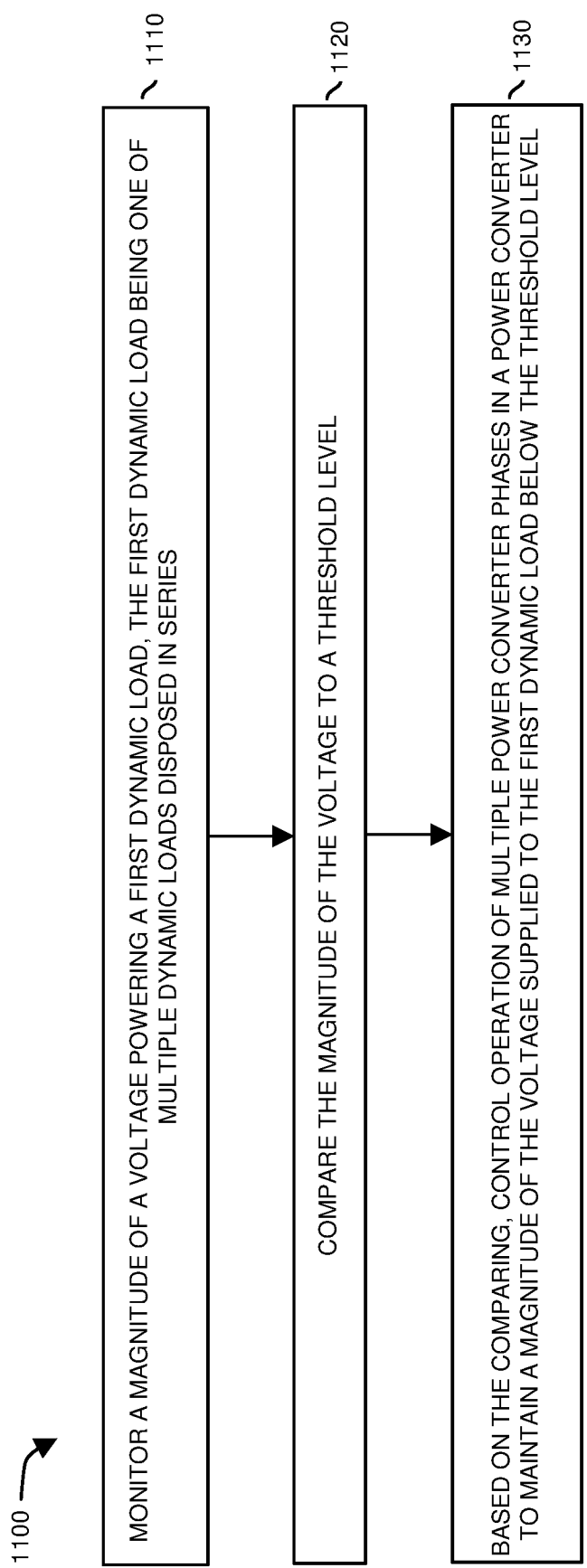
FIG. 11 is an example diagram illustrating a method according to embodiments herein.

FIG. 11 is an example diagram illustrating a method of controlling a power converter according to embodiments herein.

In processing operation 1110, the controller 140 (such as controller 140-N with respect to return path RtnN, where N is an integer value) monitors a magnitude of a voltage (such as VoutN with respect to return path RtnN, where N is an integer value) powering a dynamic load 118 (such as load 118-N, where N is an integer value). As previously discussed, the dynamic load 118-N is one of the series connected dynamic loads 118-1, 118-2, etc., collectively powered by supply current 115 produced by the power source 111.

In processing operation 1120, the controller 140 compares the magnitude of the voltage (VoutN) to a reference voltage RVN.

In processing operation 1130, based on the comparing, the controller 140 controls operation of multiple power converter phases in a respective power converter 121-N to maintain a magnitude of the voltage VoutN supplied to the dynamic load 118-N.

FIG. 12 is an example diagram illustrating assembly of a power supply and multiple interconnected power converter phases on a circuit board according to embodiments herein.

In this example embodiment, assembler 1240 receives a substrate 1210 and corresponding components of power supply 100 to apply components such as power converters and corresponding dynamic loads. The assembler 1240 affixes (couples) each power converter and corresponding dynamic load onto the substrate 1210.

Via respective circuit paths 1222 as described herein, the assembler 1240 provides connectivity between a respective power converter and dynamic load. Note that components such as associated with the power converters 121, dynamic loads 118, etc., can be affixed or coupled to the substrate 1210 in any suitable manner. For example, one or more of the components associated with the power converters 121 and the dynamic loads 118 can be soldered to the substrate 1210, inserted into sockets disposed on the substrate 1210, etc.

Note further that the substrate 1210 is optional. Any of one or more circuit paths or connectivity as shown in the drawings and as described herein can be disposed in cables or other suitable medium.

In one nonlimiting example embodiment, one or more of the dynamic loads 118 are disposed on their own substrate independent of substrate 1210; the substrate of the loads 118 is directly or indirectly connected to the substrate 1210 via wires, cables, links, etc. The power converters or any portion of the power supply controller and corresponding power converter phases can be disposed on a standalone smaller board plugged into a socket of the substrate 1210 as well.

Via one or more circuit paths 1222 (such as one or more traces, cables, connectors, wires, conductors, electrically conductive paths, etc.), the assembler 1240 couples the respective power converter to the corresponding dynamic load.

Accordingly, embodiments herein include a system comprising: a substrate 1210 (such as a circuit board, standalone board, mother board, standalone board destined to be coupled to a mother board, host, etc.); power converters 121 including corresponding components as described herein; and a load 118 (such as a motor, winding, etc.).

Note again that each of the loads 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1210 or disposed at a remote location.

Note again that techniques herein are well suited for use in circuit applications such as those that implement feedback monitoring. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
    a controller operative to:
        monitor a magnitude of a voltage powering a first dynamic load, the first dynamic load being one of multiple dynamic loads disposed in series;
        compare the magnitude of the voltage to a first reference voltage;
        control operation of multiple power converter phases in a power converter to control the magnitude of the voltage powering the first dynamic load to be below the first reference voltage;
        wherein the controller is operative to regulate the magnitude of the voltage powering the first dynamic load via varying an amount of supplemental current supplied by the power converter to the first dynamic load;
        wherein the controller is operative to switch between generating the supplemental current as a positive current and a negative current;
        wherein the controller is further operative to generate the supplemental current in a first direction through the first dynamic load during a first condition in which the magnitude of the voltage falls in a first portion of a voltage range between the first reference voltage and a second reference voltage; and
        wherein the controller is further operative to generate the supplemental current in a second direction through the first dynamic load during a second condition in which the magnitude of the voltage falls in a second portion of the voltage range between the first reference voltage and the second reference voltage, the second direction being opposite the first direction.

2. The apparatus as in claim 1, wherein the first dynamic load is operative to receive current supplied from a second dynamic load of the multiple dynamic loads disposed in series; and
    wherein the controller is further operative to vary a number of the multiple power converter phases that are activated to regulate the voltage below the first reference voltage.

3. The apparatus as in claim 1, wherein the controller is operative to at least temporarily operate a first power converter phase of the multiple power converter phases in a variable switching frequency mode to regulate the magnitude of the voltage below the first reference voltage.

4. The apparatus as in claim 1, wherein the controller is further operative to at least temporarily operate a first power converter phase of the multiple power converter phases in a discontinuous conduction mode to regulate the magnitude of the voltage powering the first dynamic load.

5. The apparatus as in claim 1, wherein the operation of the multiple power converter phases is operative to adjust an amount of the supplemental current through the first dynamic load.

6. The apparatus as in claim 5, wherein the controller is further operative to vary a number of the multiple power converter phases that are simultaneously activated to adjust the amount of the supplemental current through the first dynamic load.

7. The apparatus as in claim 6, wherein the simultaneous activation of the multiple power converter phases is operative to regulate the voltage below the first reference voltage.

8. The apparatus as in claim 1, wherein the controller is operative to, for a first time duration, operate a first power converter phase of the multiple power converter phases in a discontinuous conduction mode to maintain the magnitude of the voltage below the first reference voltage.

9. The apparatus as in claim 8, wherein the controller is further operative to, for a second duration following the first time duration, operate the first power converter phase of the multiple power converter phases in a continuous conduction mode to regulate the magnitude of the voltage below the first reference voltage.

10. The apparatus as in claim 9, wherein the controller is further operative to, for a third duration following the second time duration, activate the first power converter phase and a second power converter phase of the multiple power converter phases to regulate the magnitude of the voltage below the first reference voltage.

11. The apparatus as in claim 1, wherein the controller is further operative to sequentially activate additional power converter phases over time in response to a condition in which the first dynamic load consumes less current over time.

12. A method comprising:
monitoring a magnitude of a voltage powering a first dynamic load, the first dynamic load being one of multiple dynamic loads disposed in series;
comparing the magnitude of the voltage to a first reference voltage;
controlling operation of multiple power converter phases in a power converter to control the magnitude of the voltage powering the first dynamic load to be below the first reference voltage;
regulating the magnitude of the voltage powering the first dynamic load via varying an amount of supplemental current supplied by the power converter to the first dynamic load;
switching between generating the supplemental current as a positive current and a negative current;
generating the supplemental current in a first direction through the first dynamic load during a first condition in which the magnitude of the voltage falls in a first portion of a voltage range between the first reference voltage and a second reference voltage; and
generating the supplemental current in a second direction through the first dynamic load during a second condition in which the magnitude of the voltage falls in a second portion of the voltage range between the first reference voltage and the second reference voltage, the second direction being opposite the first direction.

13. The method as in claim 12, wherein the first dynamic load receives current supplied from a second dynamic load of the multiple dynamic loads disposed in series, the method further comprising:
varying a number of the multiple power converter phases that are activated to regulate the voltage below the first reference voltage.

14. The method as in claim 12 further comprising:
temporarily operating a first power converter phase of the multiple power converter phases in a variable switching frequency mode to regulate the magnitude of the voltage below the first reference voltage.

15. The method as in claim 12 further comprising:
temporarily operating a first power converter phase of the multiple power converter phases in a discontinuous conduction mode to regulate the magnitude of the voltage.

16. The method as in claim 12, wherein the controlled operation of the multiple power converter phases adjusts a magnitude of total current through the first dynamic load.

17. The method as in claim 16 further comprising:
varying a number of the multiple power converter phases that are simultaneously activated depending on a magnitude of power consumption by the first dynamic load.

18. The method as in claim 17, wherein the simultaneous activation of the multiple power converter phases is operative to regulate the voltage below the first reference voltage.

19. The method as in claim 12 further comprising:
for a first time duration, operating a first power converter phase of the multiple power converter phases in a discontinuous conduction mode to maintain the magnitude of the voltage powering the first dynamic load.

20. The method as in claim 19 further comprising:
for a second duration following the first time duration, operating the first power converter phase of the multiple power converter phases in a continuous conduction mode to regulate the magnitude of the voltage powering the first dynamic load.

21. The method as in claim 20 further comprising:
for a third duration following the second time duration, operating the first power converter phase and a second power converter phase of the multiple power converter phases in the continuous conduction mode to regulate the magnitude of the voltage powering the first dynamic load.

22. The method as in claim 12 further comprising:
sequentially activating additional power converter phases to prevent a portion of a supply current from passing through the first dynamic load over time in response to a condition in which the first dynamic load consumes less and less power over time.

23. A system comprising:
a circuit substrate; and
the apparatus of claim 1, the apparatus coupled to the circuit substrate.

24. A method comprising:
receiving a circuit substrate; and
coupling the apparatus of claim 1 to the circuit substrate.

25. Computer-readable storage hardware having instructions stored thereon, the instructions, when executed by computer processor hardware, cause the computer processor hardware to:
monitor a magnitude of a voltage powering a first dynamic load, the first dynamic load being one of multiple dynamic loads disposed in series;
compare the magnitude of the voltage to a first reference voltage; and
based on the comparison, control operation of multiple power converter phases in a power converter to control the magnitude of the voltage powering the first dynamic load to be below the first reference voltage;
regulate the magnitude of the voltage powering the first dynamic load via varying an amount of supplemental current supplied by the power converter to the first dynamic load;
switch between generating the supplemental current as a positive current and a negative current;
generate the supplemental current in a first direction through the first dynamic load during a first condition in which the magnitude of the voltage falls in a first portion of a voltage range between the first reference voltage and a second reference voltage; and
generate the supplemental current in a second direction through the first dynamic load during a second condition in which the magnitude of the voltage falls in a second portion of the voltage range between the first reference voltage and the second reference voltage, the second direction being opposite the first direction.

26. The apparatus as in claim 1, wherein the power converter is implemented as a buck converter.

27. The apparatus as in claim 1,
wherein the controller is further operative to: i) compare the magnitude of the voltage to the second reference voltage, and ii) control operation of multiple power converter phases in the power converter to control the magnitude of the voltage to be above the second reference voltage.

28. The method as in claim 1,
wherein a supply current supplied by a power source is operative to pass through each of the multiple dynamic loads including the first dynamic load; and
wherein the operation of the multiple power converter phases is operative to adjust an amount of total current through the first dynamic load to maintain the magnitude of the voltage between the first reference voltage and the second reference voltage.

29. The method as in claim 28, wherein the total current is a summation of the supply current plus the supplemental current provided by the power converter through the first dynamic load.

30. The apparatus as in claim 1, wherein a supply current supplied by a power source is operative to pass through each of the multiple dynamic loads including the first dynamic load;
wherein the power converter includes a series circuit path including a switch disposed in series with an inductor, the series circuit path disposed in parallel with the first dynamic load; and
wherein the controller is operative to control operation of the switch of the power converter to control the magnitude of supplemental current supplied by the power converter through the first dynamic load.

31. The apparatus as in claim 1, wherein a supply current supplied by a power source is operative to pass through each of the multiple dynamic loads including the first dynamic load;
wherein the power converter includes a series circuit path including a switch disposed in series with an inductor, the series circuit path disposed in parallel with the first dynamic load; and
wherein the controller is operative to activate the switch of the power converter to reduce the magnitude of the voltage powering the first dynamic load.

32. The apparatus as in claim 1 further comprising:
a series circuit path including an inductor in series with a switch; and
wherein the first dynamic load includes a first node and a second node, the series circuit path connected between the first node and the second node to supply the supplemental current through the first dynamic load to control the magnitude of the voltage.

\* \* \* \* \*